United States Patent [19]
Van Wynsberghe

[11] Patent Number: 6,086,097
[45] Date of Patent: Jul. 11, 2000

[54] VEHICLE OCCUPANT PROTECTION APPARATUS

[75] Inventor: Roy D. Van Wynsberghe, Mesa, Ariz.

[73] Assignee: TRW Inc., Lyndhurst, Ohio

[21] Appl. No.: 09/093,898

[22] Filed: Jun. 9, 1998

[51] Int. Cl.⁷ .......................... B60R 21/11; B60R 21/00; B60N 2/02

[52] U.S. Cl. ...................... 280/748; 180/282; 297/216.1; 296/68.1

[58] Field of Search ............................ 280/748; 180/282, 180/274, 271, 268; 297/216.1, 216.15, 216.16, 216.17; 296/68.1

[56] References Cited

U.S. PATENT DOCUMENTS

| | | | |
|---|---|---|---|
| 2,796,112 | 6/1957 | Barsky | 297/216.1 |
| 4,636,006 | 1/1987 | Kazaoka et al. | 297/458 |
| 5,005,894 | 4/1991 | Nagata | 296/68.1 |
| 5,046,426 | 9/1991 | Julien et al. | 102/377 |
| 5,127,671 | 7/1992 | Yano et al. | 180/282 |
| 5,167,421 | 12/1992 | Yunzhao | 296/68.1 |
| 5,340,185 | 8/1994 | Vollmer | 296/68.1 |
| 5,427,331 | 6/1995 | Stroud | 297/216.1 X |
| 5,451,094 | 9/1995 | Templin et al. | 297/216.17 |
| 5,490,706 | 2/1996 | Totani | 296/68.1 |
| 5,490,718 | 2/1996 | Akizuki et al. | 297/452.49 |
| 5,492,368 | 2/1996 | Pywell et al. | 180/282 X |
| 5,564,520 | 10/1996 | Forsythe | 180/282 |
| 5,573,269 | 11/1996 | Gentry et al. | 280/735 |
| 5,890,084 | 3/1999 | Halasz et al. | 180/282 |
| 5,906,394 | 5/1999 | Van Wynsberghe et al. | 280/737 |

OTHER PUBLICATIONS

Robinson, "A very low shock alternative to conventional, pyrotechnically operated release devices," The Second NASA Aerospace Pyrotechnic Systems Workshop, pp. 223–231, Feb. 1, 1994.

Primary Examiner—J. J. Swann
Assistant Examiner—F. Zeender
Attorney, Agent, or Firm—Tarolli, Sundheim, Covell, Tummino & Szabo L.L.P.

[57] ABSTRACT

An apparatus (10) includes a vehicle seat (12) and a release device (80) which is mounted on the seat (12). The seat (12) includes a cushion (26), a frame (16), and a spring (70). The spring (70) is connected to the frame (16) in a load-bearing relationship with the cushion (26) so as to transmit a vehicle occupant weight load from the cushion (26) to the frame (16). The release device (80) is actuatable to release the spring (70) from the load-bearing relationship.

8 Claims, 3 Drawing Sheets

VEHICLE OCCUPANT PROTECTION APPARATUS

FIELD OF THE INVENTION

The present invention relates to an apparatus which helps protect a vehicle occupant upon the occurrence of a vehicle crash, and particularly relates to an apparatus which helps protect a vehicle occupant upon the occurrence of a rollover vehicle crash.

BACKGROUND OF THE INVENTION

A vehicle crash that involves overturning movement of the vehicle is known as a rollover crash. When a vehicle experiences a rollover crash, crash forces may tend to move a vehicle occupant off a seat in a direction toward the vehicle roof.

SUMMARY OF THE INVENTION

In accordance with the present invention, an apparatus comprises a vehicle seat and a release device which is mounted on the seat. The seat includes a cushion, a frame, and a spring. The spring is connected to the frame in a load-bearing relationship with the cushion so as to transmit a vehicle occupant weight load from the cushion to the frame. The release device is actuatable to release the spring from the load-bearing relationship.

The present invention enables a vehicle occupant weight load to push the seat cushion toward the vehicle floor, and thus enables the force of gravity to move an occupant of the seat toward the vehicle floor. Such movement of the occupant increases the distance between the occupant's head and the vehicle roof to help protect the occupant from a forceful impact with the roof in a rollover crash.

BRIEF DESCRIPTION OF THE DRAWING

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
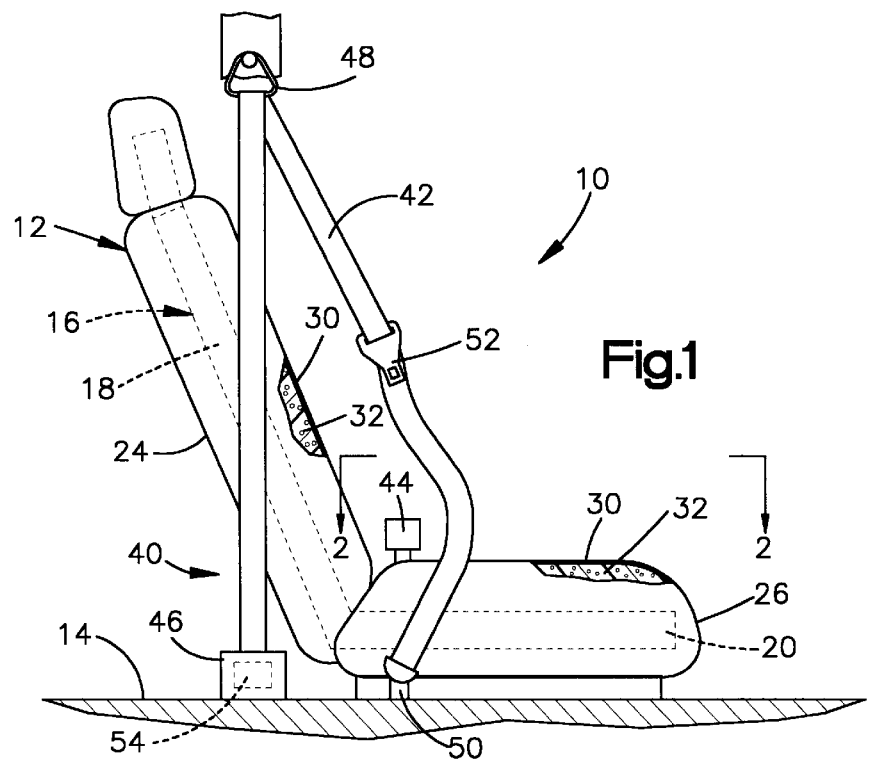
FIG. 1 is a side view of an apparatus including a vehicle seat comprising a first embodiment of the present invention.

An apparatus 10 comprising a first embodiment of the present invention is shown partially in FIG. 1. The apparatus 10 includes a vehicle seat 12 on a vehicle floor 14. The seat 12 has a frame 16 with a back portion 18 and a bottom portion 20. A back cushion 24 covers the back portion 18 of the frame 16, and a bottom cushion 26 covers the bottom portion 20 of the frame 16. Each of the cushions 24 and 26 is a deflectable structure comprising an outer layer 30 on a compressible base 32. The outer layers 30 are preferably formed of fabric or leather. The bases 32 are preferably formed of elastomeric foam.

The apparatus 10 further includes a restraint system 40 for restraining an occupant of the seat 12 upon the occurrence of a crash. The restraint system 40 includes seat belt webbing 42 and a seat belt buckle 44. The webbing 42 extends upward from a seat belt retractor 46 to a D-ring 48, through the D-ring 48, and downward from the D-ring 48 to an anchor 50. A locking tongue 52 on the webbing 42 is releasably lockable in the buckle 44 when the webbing 42 has been extended about an occupant of the seat 12, as known in the art.

A seat belt pretensioner 54 (shown schematically) is operatively associated with the retractor 46. The pretensioner 54 is a known device that cooperates with the retractor 46 to impart tension to the webbing 42 upon the occurrence of a crash. Such tension helps the webbing 42 restrain an occupant of the seat 12.

Figure 2:
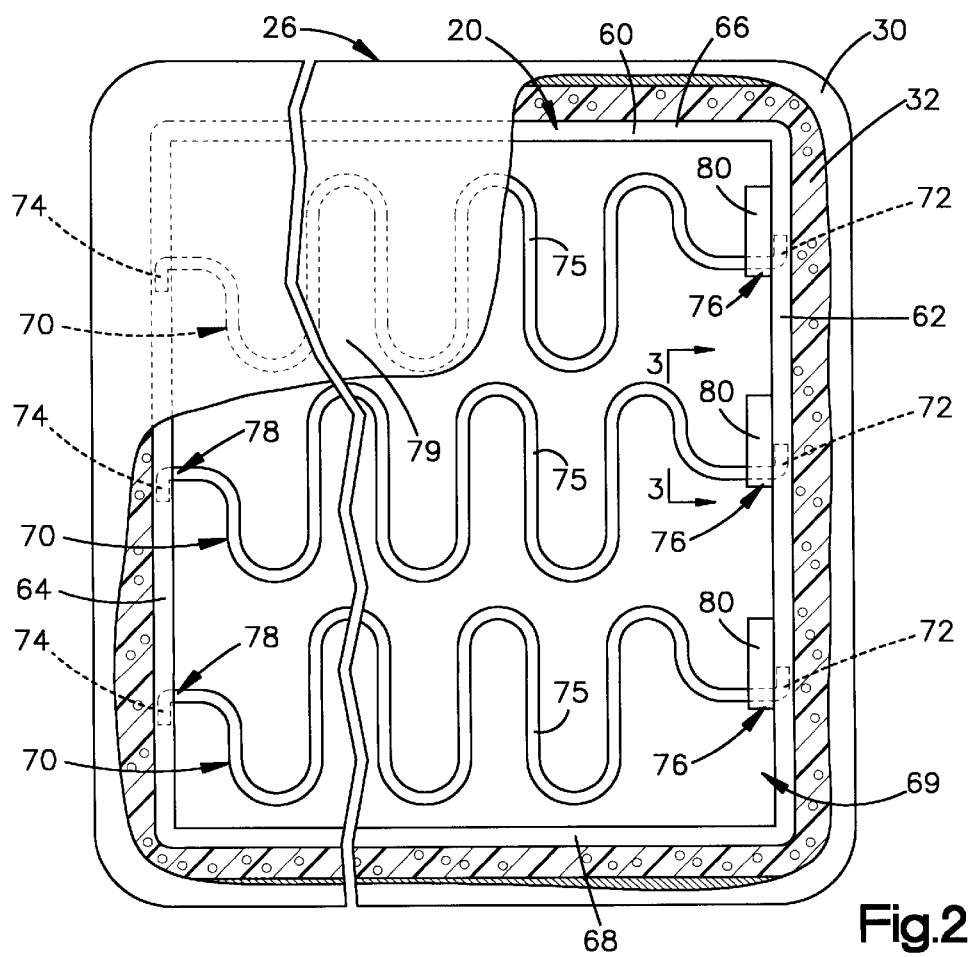
FIG. 2 is a partial view taken along line 2—2 of FIG. 1.

As viewed from above in FIG. 2, the bottom cushion 26 has a generally rectangular peripheral shape. The bottom portion 20 of the frame 16 includes a tubular part 60 which extends in a corresponding rectangular configuration. The tubular part 60 has a front section 62, a rear section 64, and a pair of opposite side sections 66 and 68 extending between the front and rear sections 62 and 64. The four sections 62–68 of the tubular part 60 together define a rectangular opening 69.

A plurality of springs 70 are mounted on the tubular part 60 in a known manner. Specifically, each spring 70 is a wire structure with a front end portion 72, a rear end portion 74, and a major length portion 75 extending between the front and rear end portions 72 and 74 in a generally sinusoidal configuration. The front and rear end portions 72 and 74 of each spring 70 have hook-like configurations, and are received through corresponding apertures 76 and 78 in the front and rear sections 62 and 64 of the tubular part 60, respectively. The springs 70 are thus suspended by and between the front and rear sections 62 and 64 of the tubular part 60. The springs 70 could alternatively be suspended by and between the opposite side sections 66 and 68 of the tubular part 60. In either case, the springs 70 support a portion 79 of the bottom cushion 26 that extends across the opening 69 above the springs 70. Accordingly, when a vehicle occupant sits on the seat 12, the springs 70 transmit the weight load of the vehicle occupant from the bottom cushion 26 to the tubular part 60.

Also shown in FIG. 2 are a plurality of release devices 80 which are actuatable to release the springs 70 from the tubular part 60. The release devices 80 are alike. As shown by way of example in FIG. 3, each release device 80 includes a cylinder 82 containing a piston 84 and a charge of pyrotechnic material 86. A rigid fastening structure (not shown), such as a weld or the like, fixes the cylinder 82 to the front section 62 of the tubular part 60 adjacent to a corresponding spring 70.

Figure 3:
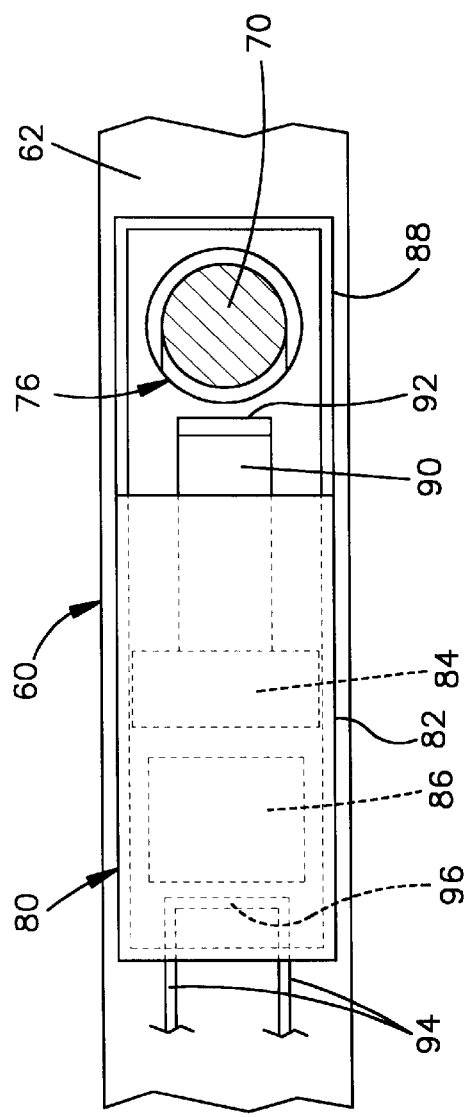
FIG. 3 is a view taken on line 3—3 of FIG. 2.

As further shown in FIG. 3, each release device 80 has a collar 88 at one end of the cylinder 82. The collar 88 extends around the spring 70. An output member 90 is fixed to the piston 84 in the cylinder 82. The output member 90 projects from the cylinder 82 within the collar 88, and has a cutting edge 92 adjacent to the spring 70. A pair of electrical leads 94 project outward from the opposite end of the cylinder 82. An ohmic heating element 96 in the cylinder 82 is connected between the leads 94 adjacent to the pyrotechnic material 86.

Figure 4:
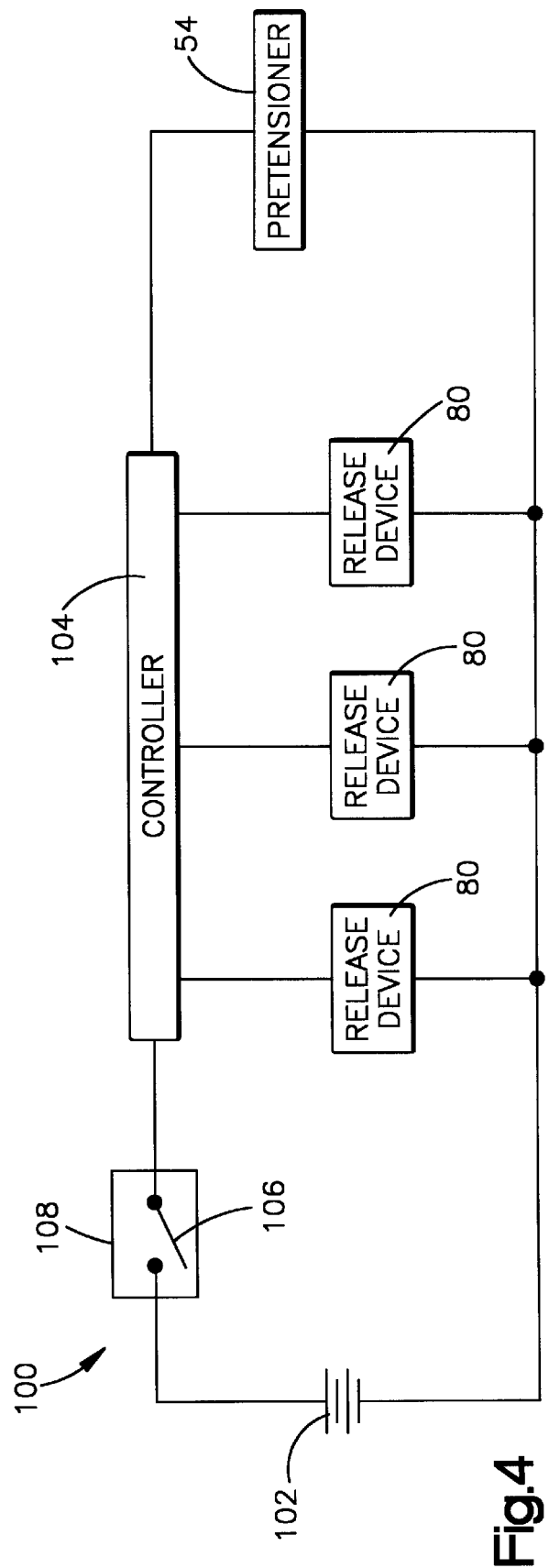
FIG. 4 is a schematic view of an electrical circuit including parts of the apparatus of FIG. 1.

As shown schematically in FIG. 4, the pretensioner 54 and the release devices 80 are connected in an electrical circuit 100 with a power source 102, a controller 104, and a normally open switch 106. The power source 102 preferably comprises the vehicle battery and/or a capacitor. The controller 104 comprises a microprocessor which is known in the art. The switch 106 is part of a sensor 108 which senses one or more vehicle conditions indicating the occurrence of a crash. Such a sensor also is known in the art. Preferably, the crash-indicating conditions sensed by the sensor 108 include a condition that indicates the occurrence of a rollover crash.

The sensor 108 may sense a crash-indicating condition that meets or exceeds a predetermined threshold level. The switch 106 then closes, and the controller 104 responds by directing electric current through the pretensioner 54 to actuate the pretensioner 54. The controller 104 further responds by directing electric current through the release devices 80 to actuate the release devices 80. Specifically, the controller 104 directs electric current through each release device 80 between the leads 94 (FIG. 3). This causes each ohmic heating element 96 to ignite the adjacent charge of pyrotechnic material 86. The pyrotechnic material 86 then generates combustion products that propel the piston 84 toward the opposite end of the cylinder 82, i.e., to the right as viewed in FIG. 3. The piston 84 simultaneously moves the output member 90 against the corresponding spring 70 such that the cutting edge 92 severs the spring 70 within the collar 88.

When the springs 70 are severed in the foregoing manner, the major length portions 75 (FIG. 2) of the springs 70 are separated from the front end portions 72. The springs 70 are thus released from their load-bearing relationship with the bottom cushion 26 and the tubular part 60. This enables a vehicle occupant weight load to push the bottom cushion 26 toward the floor 14 through the rectangular opening 69 defined by the tubular part 60. An occupant of the seat 12 can then be moved toward the floor 14 by the force of gravity, by tension imparted to the webbing 42 upon actuation of the pretension 54, and/or by inertial forces that accelerate the occupant relative to the floor 14 in a rollover crash. Such movement of the occupant increases the distance between the occupant's head and the vehicle roof to help protect the occupant from a forceful impact with the roof.

Figure 5:
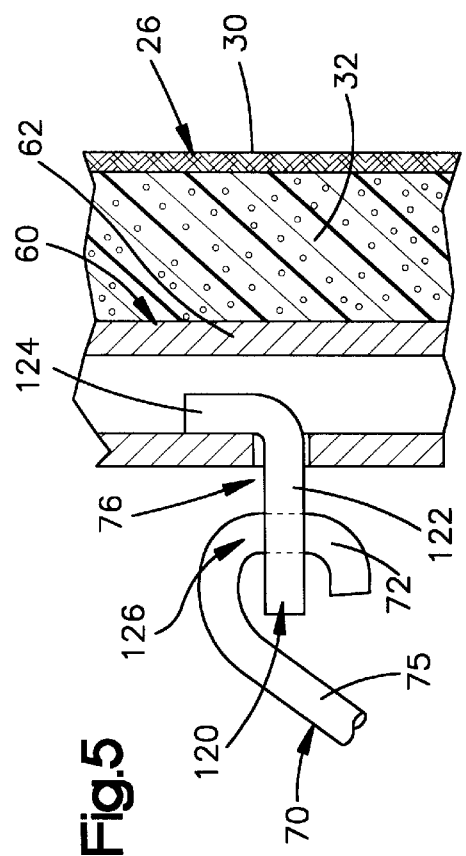
FIG. 5 is a partial view of an apparatus comprising a second embodiment of the present invention.

In a second embodiment of the present invention, the release devices 80 are replaced by alternative release devices 120, one of which is shown in FIG. 5. Each alternative release device 120 is an L-shaped part received through a corresponding aperture 76 in the front section 62 of the tubular part 60. A long section 122 of the release device 120 projects outward from the aperture 76. A short section 124 of the release device 120 projects at a right angle from the long section 122 within the tubular part 60. The front end portion 72 of the corresponding spring 70 is received through an aperture 126 in the long section 124 of the release device 120. In this arrangement, the release device 120 interconnects the spring 70 with the tubular part 60 so as to transmit a vehicle occupant weight load from the spring 70 to the tubular part 60.

Figure 6:
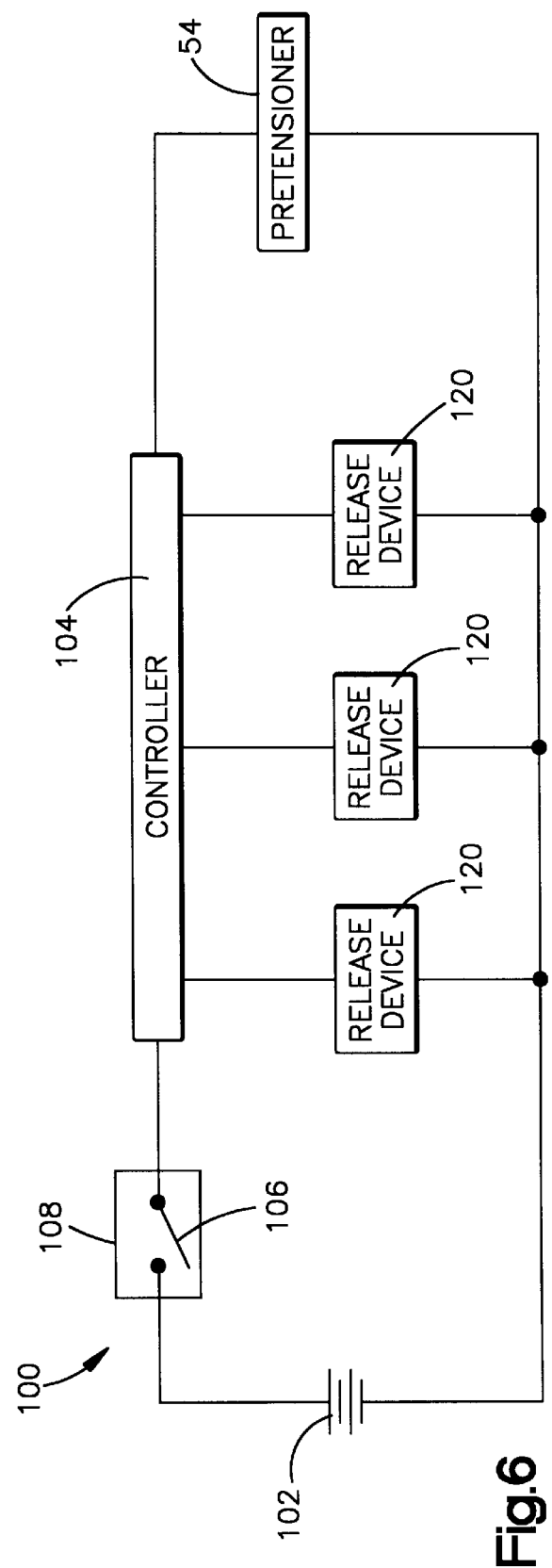
FIG. 6 is a schematic view of an electrical circuit including parts of the second embodiment of the present invention.

The release devices 120 are included in the electrical circuit 100 in place of the release devices 80, as shown in FIG. 6. The controller 104 directs an actuating level of electric current through each release device 120 when the switch 106 closes. Further in accordance with the present invention, each release device 120 is made of a metal material which can be substantially weakened by the passage of electric current through the material. The material is normally strong enough for the release device 120 to transmit vehicle occupant weight loads from the spring 70 to the tubular part 60. The release device 120 thereby retains the spring 70 in a load-bearing relationship with the bottom cushion 26 and the tubular part 60 throughout ordinary operation of the vehicle. However, when the material conducts the actuating level of electric current, its strength is reduced sufficiently for the release device 120 to rupture under the stress induced by a vehicle occupant weight load. The release devices 120 are thus actuatable to release the springs 70 from their load-bearing relationship with the bottom cushion 26 and the tubular part 60 upon the occurrence of a vehicle crash.

In accordance with a particular feature of the present invention, the material of which the release devices 120 are made is preferably a shape memory effect alloy. That material is most preferably a shape memory effect alloy comprising a stoichiometric mixture of nickel and titanium which is known as nitinol.

From the above description of the invention, those skilled in the art will perceive improvements, changes and modifications. Such improvements, changes and modifications within the skill of the art are intended to be covered by the appended claims.

What is claimed is:

1. Apparatus comprising:
   a vehicle seat including a cushion, a frame, and a spring connected to said frame in a load-bearing relationship with said cushion so as to transmit a vehicle occupant weight load from said cushion to said frame; and
   a release device mounted on said seat, said release device being actuatable to disconnect said spring from said frame to irreversibly release said spring from said load-bearing relationship.

2. Apparatus as defined in claim 1 further comprising means for actuating said release device upon the occurrence of a vehicle crash.

3. Apparatus as defined in claim 2 wherein said actuating means includes means for sensing the occurrence of a rollover crash and means for responding to said sensing means by actuating said release device.

4. Apparatus as defined in claim 3 further comprising a vehicle occupant restraint system including seat belt webbing which is extendable about an occupant of said seat, said restraint system further including a pretensioner which is actuatable to impart tension to said webbing.

5. Apparatus as defined in claim 1 wherein said release device is actuatable to sever said spring.

6. Apparatus as defined in claim 1 wherein said release device comprises a mounting member which interconnects said spring and said frame, said mounting member being formed of a material having a strength sufficient for said mounting member normally to retain said spring in said load-bearing relationship, said material being responsive to electric current so as to have a second, lesser strength when subjected to electric current of at least a predetermined actuating level, said second strength being insufficient for said mounting member to retain said spring in said load-bearing relationship.

7. Apparatus as defined in claim 6 further comprising means for subjecting said mounting member to said actuating level of electric current upon the occurrence of a vehicle crash.

8. Apparatus as defined in claim 7 wherein said material is a shape memory effect alloy.

* * * * *